United States Patent [19]

Borras et al.

[11] Patent Number: 5,301,353
[45] Date of Patent: Apr. 5, 1994

[54] COMMUNICATION SYSTEM AND APPARATUS

[75] Inventors: Jaime A. Borras, Hialeah; David D. Johnson, Lighthouse Point, both of Fla.

[73] Assignee: Motorola, Inc., Schaumburg, Ill.

[21] Appl. No.: 99,269

[22] Filed: Jul. 29, 1993

Related U.S. Application Data

[63] Continuation of Ser. No. 478,866, Feb. 12, 1990, abandoned.

[51] Int. Cl.$^5$ .................. H04B 1/60; H04B 17/02; G08B 25/00
[52] U.S. Cl. .................. 455/9; 455/53.1; 455/54.2; 455/67.4; 455/89; 340/539; 359/145; 359/152; 359/172; 359/173
[58] Field of Search .................. 340/306, 307, 539; 359/145, 146, 147, 165, 172, 152, 73; 379/56, 58, 59, 60, 63; 455/344, 346, 347, 9, 33.1, 33.2, 33.3, 33.4, 53.1, 54.1, 54.2, 56.1, 15, 16, 38.2, 38.4, 67.1, 62, 67.4, 67.7, 92, 226.1, 226.4

[56] References Cited

U.S. PATENT DOCUMENTS

| | | | |
|---|---|---|---|
| 4,296,408 | 10/1981 | Neuringer | 340/306 |
| 4,331,953 | 5/1982 | Blevins et al. | 340/306 |
| 4,456,793 | 6/1984 | Baker et al. | 359/165 |
| 4,542,262 | 9/1985 | Ruff | 379/56 |
| 4,630,035 | 12/1986 | Stahl et al. | 340/307 |
| 4,633,231 | 12/1986 | Kilian | 340/307 |
| 4,752,949 | 6/1988 | Steinbeck | 379/63 |
| 4,775,996 | 10/1988 | Emerson et al. | 379/56 |
| 4,790,000 | 12/1988 | Kinoshita | 379/59 |
| 4,870,698 | 9/1989 | Katsuyama et al. | 455/127 |
| 4,885,766 | 12/1989 | Yasuoka et al. | 359/145 |
| 4,904,993 | 2/1990 | Serto | 359/145 |
| 4,941,207 | 7/1990 | Maeda et al. | 359/172 |
| 4,964,693 | 10/1990 | Branan, Jr. et al. | 359/146 |
| 4,977,619 | 12/1990 | Cummins | 359/172 |
| 4,989,230 | 1/1991 | Gillig et al. | 379/59 |
| 5,109,400 | 4/1992 | Patsiokas et al. | 455/33.1 |

FOREIGN PATENT DOCUMENTS

| | | | |
|---|---|---|---|
| 62-262520 | 11/1987 | Japan . | |
| 63-133798 | 6/1988 | Japan | 379/56 |

Primary Examiner—Reinhard J. Eisenzopf
Assistant Examiner—Lisa Charouel
Attorney, Agent, or Firm—Pedro P. Hernandez

[57] ABSTRACT

A communication device (16) comprises first and second transceivers and apparatus for determining when the communication device (16) is in an on-site area (11) and when the communication device (16) is in an off-site area. The first transceiver transmits and receives signals on a first communication medium (17), when the communication device (16) is in a first area (11); whereas, second transceiver transmits and receives signals on a second communication medium (28), when the communication device (16) is in a second area.

5 Claims, 5 Drawing Sheets

COMMUNICATION SYSTEM AND APPARATUS

This is a continuation of application Ser. No. 07/478,866, filed on Feb. 12, 1990 and now abandoned.

TECHNICAL FIELD

This invention relates generally to communication systems, and more particularly to a local area communication system for reducing channel congestion.

BACKGROUND

Generally, local area communication systems, commonly referred to as on-site systems, operate as low power communication systems that facilitate communication within a building or other small geographic area (site). By employing low power transmitters, on-site transceivers enjoy a longer battery life, and may be made physically smaller and lighter than their high power transceiver counterparts. However, on-site systems may be subject to problems such as radio-frequency (RF) channel overcrowding. Thus, the present invention solves this problem by providing a communication system whereby different communication media may be used for communication within and without the on-site environment.

SUMMARY OF THE INVENTION

Briefly, according to the invention, a communication device comprises first and second transceiver means and means for determining when the communication device is operating in an on-site area and when the communication device is operating in an off-site area. The first transceiver means transmits and receives signals on a first communication medium, when the communication device is operating in the on-site area; whereas, second transceiver means transmits and receives signals on a second communication medium, when the communication device is operating in the off-site area.

DETAILED DESCRIPTION OF THE PREFERRED EMBODIMENT

Figure 1:
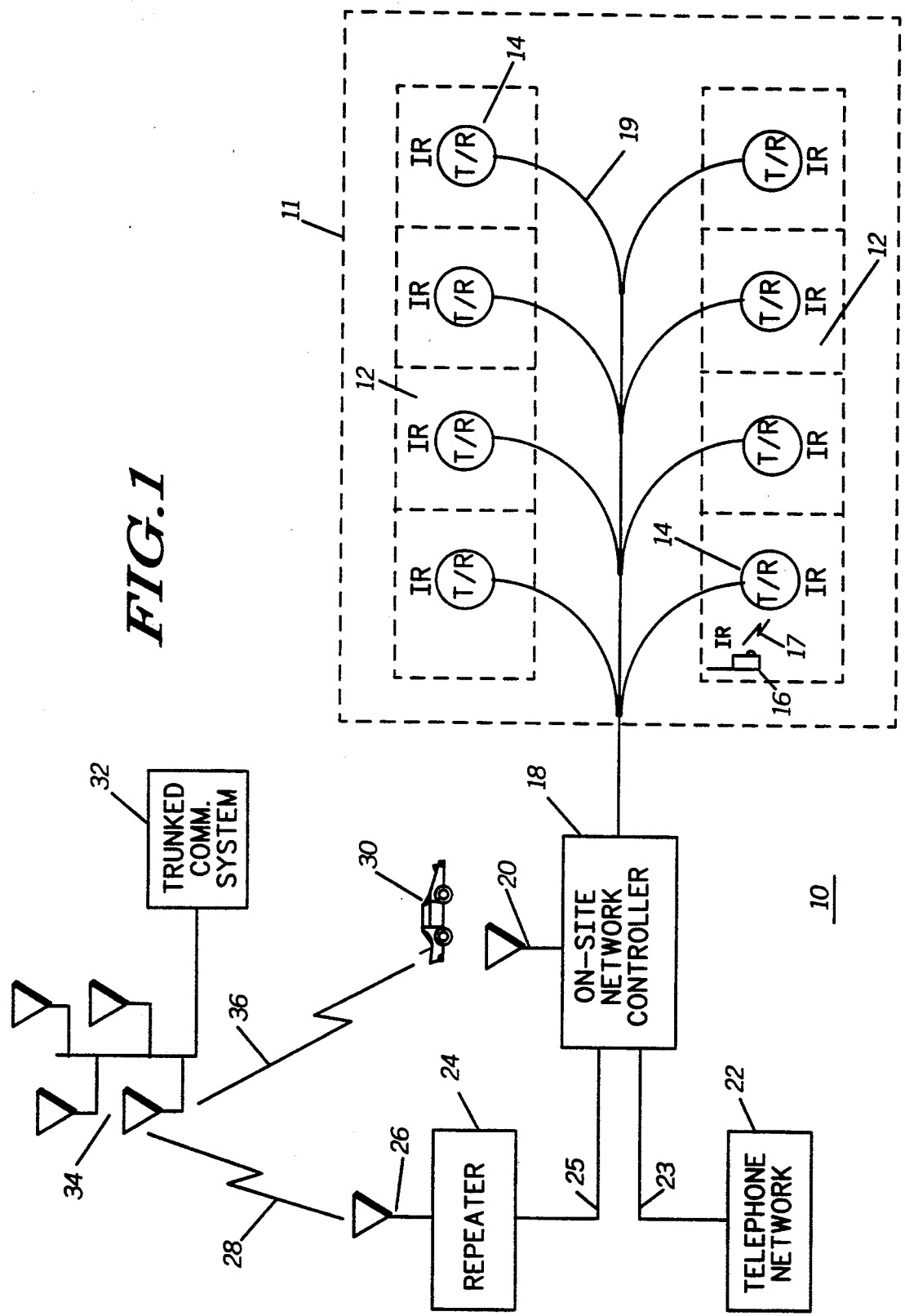
FIG. 1 shows a communication system in accordance with the present invention.

Referring to FIG. 1, an on-site/off-site communication system 10 comprises an on-site area 11 (e.g., a building) with a plurality of rooms (or areas) 12, and an off-site area (i.e., the area outside the on-site area). Each room 12 contains a stationary infrared (IR) transceiver 14 for communicating with other transceivers that enter the room 12. In other embodiments, the transceiver 14 could communicate on other communication media, such as ultrasonic waves. Preferably, a wired communication link 19 (comprising several individual lines) connects each room to an on-site network controller 18 that operates on two different frequencies or services and that includes an antenna 20 for re-transmission of signals received from an IR transceiver 14, or for re-transmission of any off-site radio-frequency signals that it receives through its antenna 20. A portable communication unit (or transceiver) 16 includes transceivers that can communicate on two different communication media (IR and RF, in this example). When it is within the on-site network, the portable communication unit 16 can communicate with the IR transceiver 14 (that is located in the room in which the portable communication unit is in) through an IR medium 17. Alternatively, the portable unit 16 may communicate with other communication units (e.g., a mobile radio 30) on the RF medium.

The network controller 18 communicates with off-site network(s) by the antenna 20. A repeater 24, with an antenna 26, represents a possible plurality of repeaters for communication among communication units in the on-site system and portable and mobile units in the off-site system (or among units within the off-site system). The repeater 24 may be either a conventional repeater or a "smart" repeater. A smart repeater is capable of storing and replaying messages to a user, and may also be capable of keeping track of the locations of its users (e.g., by a registration and/or polling procedure). The repeater 24 may be coupled to the on-site network controller 18 by wire 25 (or radio). A public or private telephone company network 22 could be also coupled (by wire 23, for example) to the on-site network controller 18 for facilitating communication among the on-site and off-site units and telephones in the telephone company network 22.

The transceiver 14 may repeat the IR signals from the portable 16 to other transceivers 16 within the on-site network (through the wired network 19). The transceiver 14 can also repeat the IR signals received from the portable 16 to portable or mobile units outside the on-site network. Preferred methods of repeating IR signals of a portable 16 use either specialized mobile radio (SMR) services within a trunked or a conventional communication system. According to a preferred embodiment, a trunked communication system 32 includes a plurality of antennas 34 for communication with units within the system 32. For example, a mobile unit 30 could transmit a signal 36 to the portable 16 through the trunked system 32. The trunked system 32 would locate an available channel and communicate with the portable 16 (if within range) or with the repeater 26 for retransmission. When the repeater 24 receives an outbound signalling word (OSW) directed to the portable 16, it decodes the trunking protocol in the OSW and looks up the portable 16 in a table to determine whether the portable 16 is within the on-site area 11. The portable 16 may also communicate with telephones within the telephone company network 22 (through the wired network 19 and the on-site network controller 18). Thus, by using the IR medium 17 while on-site, the portable 16 avoids possible radio frequency channel congestion problems. In addition the use of the on-site communication network enables the system controller 18 to keep track of the location of the portable 16.

Figure 2:
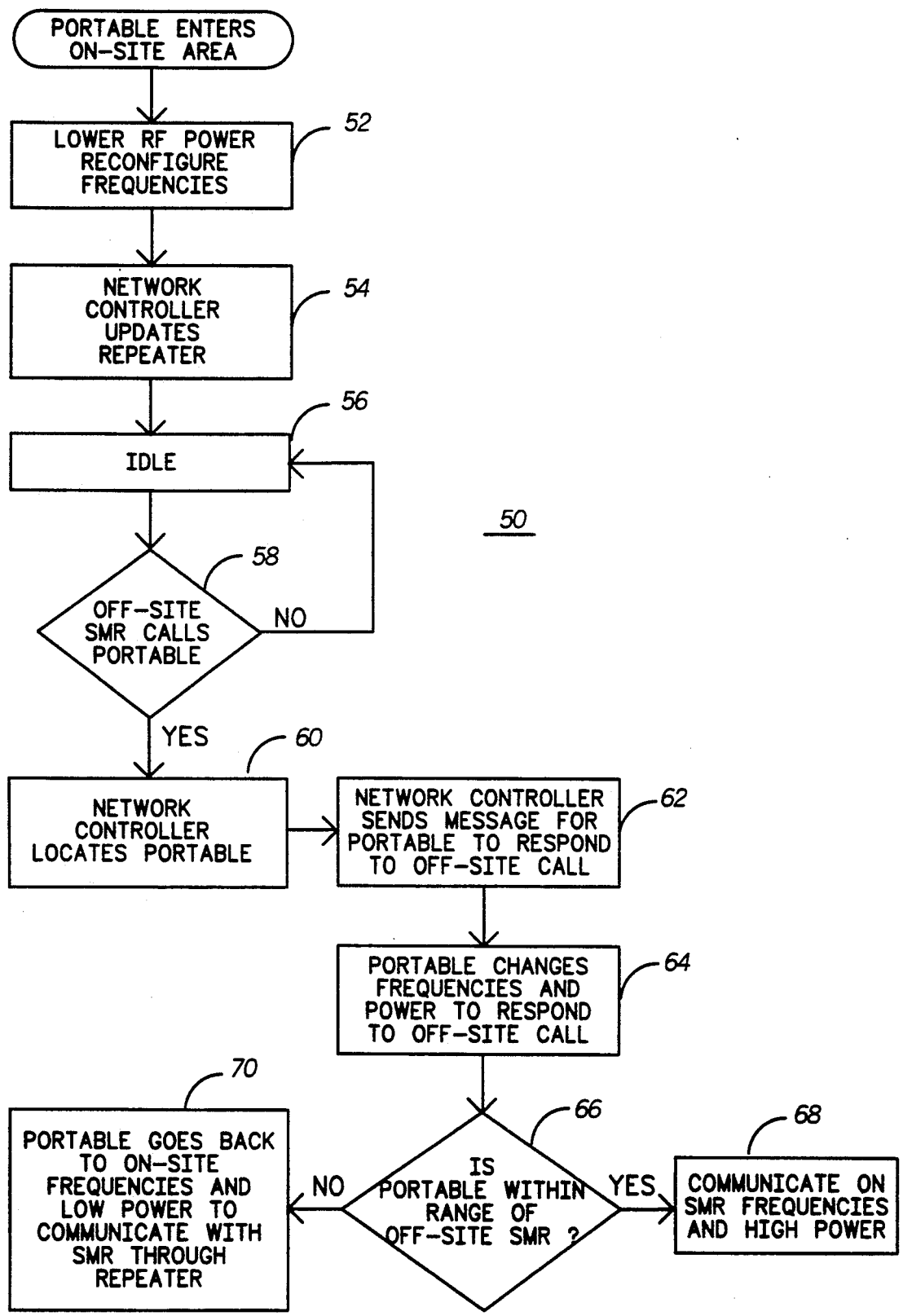
FIG. 2 is a flow diagram of the operation of a portable transceiver in accordance with the present invention.

Referring to FIG. 2, the flow chart 50 illustrates one preferred mode of operation of a system in accordance with the invention. First, a portable 16 operating on an RF communication medium enters the on-site area 12. Preferably, the network controller 18 "knows" that the portable 16 is in the on-site area 11 upon receipt of a registration code that is transmitted by the transceiver. It is also possible to operate the network controller 18 so that it periodically polls the on-site area 11 to determine which communication units are within that area 11. Upon recognizing that it is in the on-site area 12, the portable 16 lowers its RF power output and reconfigures its operating frequencies (52) to operate within a different communication medium (e.g. IR), while inside the on-site area 11. The network controller then updates (54) the repeater 24, so that the repeater 24 "knows" that the portable 16 is on-site. Next, the system may enter an idle mode (56) when there are no off-site SMR calls sent to the portable 16. On the other hand, when off-site SMR calls are sent to the portable 16, the network controller 18 locates (60) the portable 16 and the network controller 18 sends (62) a message to the portable 16 instructing it to respond to the off-site call. Upon receiving the message, the portable 16 may change its frequencies and power level to respond to the off-site call. To reduce congestion of the IR channels, the portable 16 may respond to off-site calls on an RF channel when the portable 16 is within range of the communication unit initiating the signal.

In the event that the portable 16 is within the range of the off-site SMR, it communicates (68) on the frequencies of the SMR and at high transmitter power. If the portable 16 is not within the range of the off-site SMR, the portable 16 returns to on-site frequencies and low-power operation so that it can communicate with the SMR through the on-site network controller 18 and the repeater 24.

Figure 3:
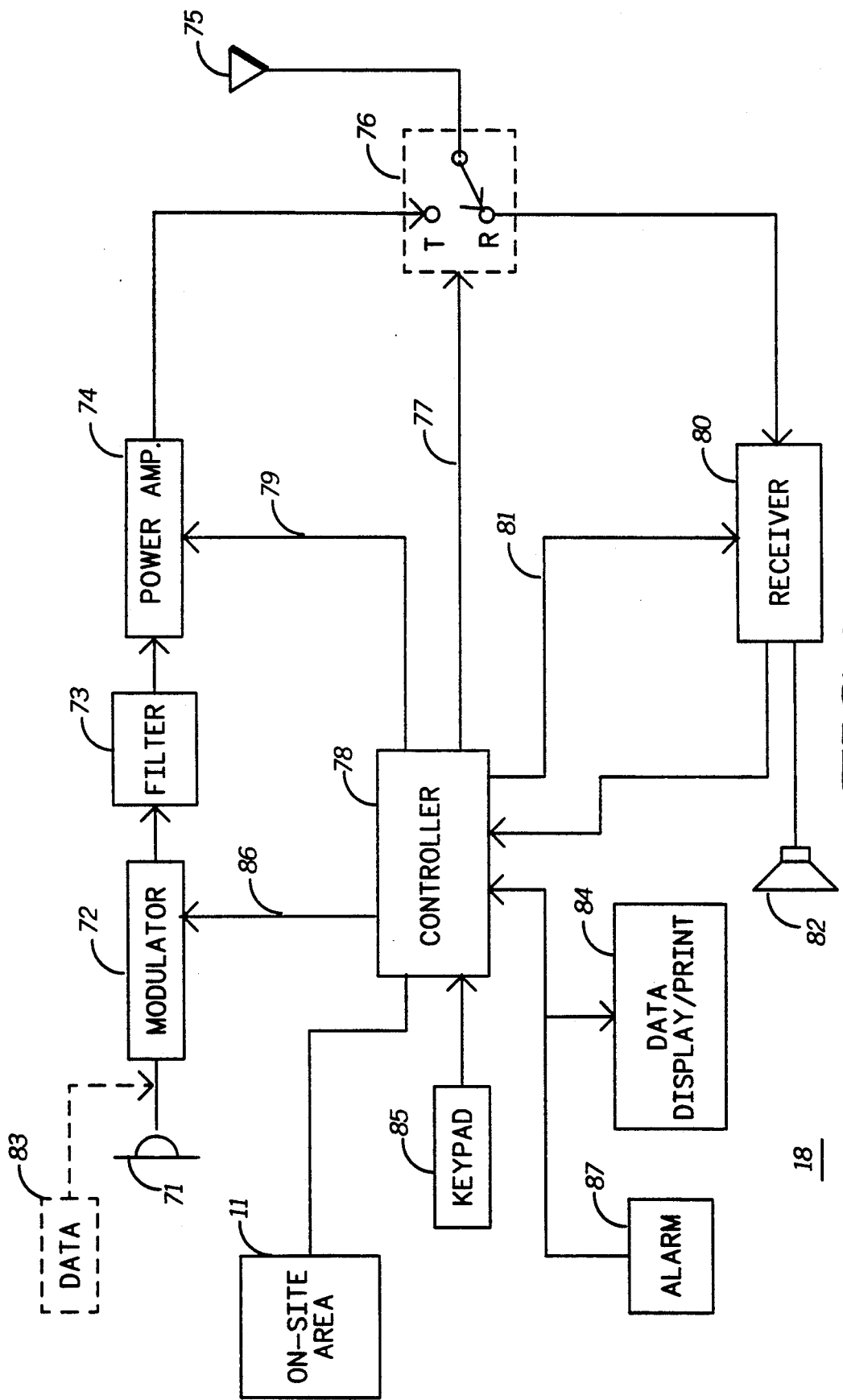
FIG. 3 is a block diagram of a network controller for an on-site communication system.

Referring to FIG. 3, a block diagram of a network controller 18 in accordance with the present invention is shown. The network controller 18 may communicate voice information with any portable 16 operating within the on-site system via the microphone 71, which routes the voice to a modulator 72, which may be any suitable modulator, such as, for example, a frequency synthesized modulator of conventional design. The modulated signal is applied to a filter 73, which appropriately band-limits the modulated signal before application to a power amplifier 74. The power amplifier 74 is coupled to an antenna 75 via an antenna switch 76, which is controlled (via line 77) by a controller 78. The controller 78 comprises the heart of the network controller 18 and controls the various elements of the network controller including the power amplifier 74, and a receiver 80 (via control lines 79 and 81 respectively). Preferably, the controller 78 comprises an MC68HC11, manufactured by Motorola, Inc., or its functional equivalent.

The receiver 80 receives radio frequency signals from the antenna 75 via the antenna switch 76, and provides demodulated audio to a speaker 82 for reception by an operator of the network controller 18. Optionally, the network controller 18 may communicate data information by coupling a data source 83 to the modulator 72, and a data display (or printer) 84 to the receiver 80, and to the controller 78.

In addition to voice and data communication, the network controller 18 is responsible for tracking each transceiver operating within the low power or on-site system. Tracking is achieved by storing each transceiver's identification code and a location code that each portable 16 automatically transmits to the network controller 18 whenever a transceiver roams from one area to another within the on-site system. In this way, the location of each individual operating a portable 16 within the on-site system may be displayed to a network supervisor via the display 84. Moreover, the network supervisor may inquire as to the status or location of any particular subscriber by entering requests and commands via the keypad 85. In certain situations, it may be desirable to monitor whether particular individuals operating transceivers within the on-site system execute prearranged security routes throughout the on-site system. Accordingly, whenever a new location code is received by the network controller 18 for such an individual, the controller 78 starts an internal timer. Should this timer expire before the individual reaches the next prearranged area, or the individual enters a different area, an alarm 87 may be activated and assistance or security personnel dispatched to the location indicated on the display 84. The controller 78 is also coupled to the on-site area 11 containing the network of IR transceivers 14 (shown in greater detail in FIG. 1). When the portable 16 is in the on-site area 11, the network controller communicates with the portable 16 via the IR transceiver 14 in the room in which the portable 16 is at.

Figure 4:
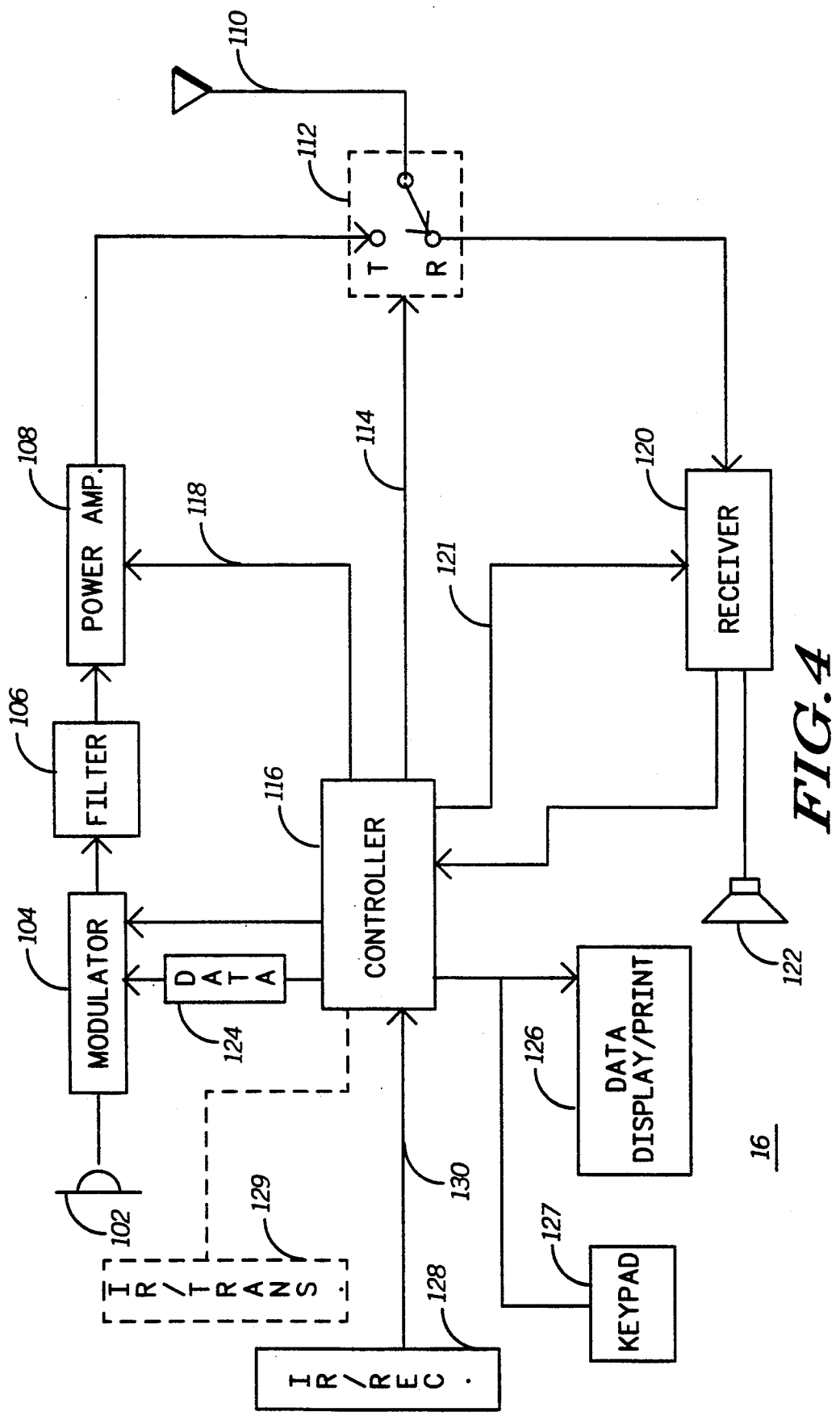
FIG. 4 is a block diagram of a radio transceiver in accordance with the invention.

Referring to FIG. 4, a block diagram of a portable 16 in accordance with the present invention is shown. Operationally, speech energy impressed upon a microphone 102 is applied to a modulator 104, which may be any suitable modulator, such as, for example, a frequency synthesized modulator of conventional design. The modulated signal is applied to a filter 106, which appropriately band-limits the modulated signal before application to a power amplifier 108. The power amplifier 108 is coupled to an antenna 110 via an antenna switch 112, which is controlled (via line 114) by a controller 116. The controller 116 comprises the heart of the portable 16 and controls the various elements of the transceiver including the power amplifier 108, and a receiver 120 (via control lines 118 and 121 respectively). Preferably, the controller comprises an MC68HC11, manufactured by Motorola, Inc., or its functional equivalent.

The receiver 120 receives radio frequency signals from the antenna 110 through the antenna switch 112, and provides demodulated audio to a speaker 122 for reception by an operator of the portable 16. Optionally, the portable 16 may communicate data information by coupling a data source 124 (controlled by the controller 116) to the modulator 104, and a data display (or printer) 126 to the receiver 120 and the controller 116.

The portable 16 also includes a secondary or control receiver, such as an IR receiver (128), which forwards information (via line 130) to the controller 116. According to the invention, this information is decoded by the controller 116 and is used to determine when the portable 16 is operating in a low power or on-site system or in a higher power off-site system. After making the system/site determination, the controller 116 may adjust the output power of the power amplifier 108 via the control line 118. Optionally, other operational parameters of the portable 16 may be adjusted. For example, the identification codes used by the portable 16 in the on-site and off-site systems may change; the communication frequencies used may vary from system to system; and, receiver parameters may be altered to allow the portable 16 to more efficiently operate within both the on-site and off-site systems. In addition, the IR transmitter 129 and receiver 128 can be used to communicate with an IR transceiver 14 when the portable 16 is in the on-site area 11, to reduce congestion of the RF channels used in the system 10. Alternately, the IR receiver 128 may be replaced with an ultra-sonic transducer, an RF receiver, electromagnetic detector, radiation detector, or functional equivalents thereof. However, IR transmission is preferred by the present invention since information transmitted via IR will not interfere with existing RF systems, and because IR radiation (i.e., the transmission illumination) is limited to the room (or area) in which it is generated. The reason for this latter limitation arises from the fact that the depth of penetration of an electromagnetic signal is inversely proportional to the square root of the transmission frequency. Therefore, optical signals cannot pass through most objects (i.e., walls or other obstructions), while radio frequency signals can.

Figure 5:
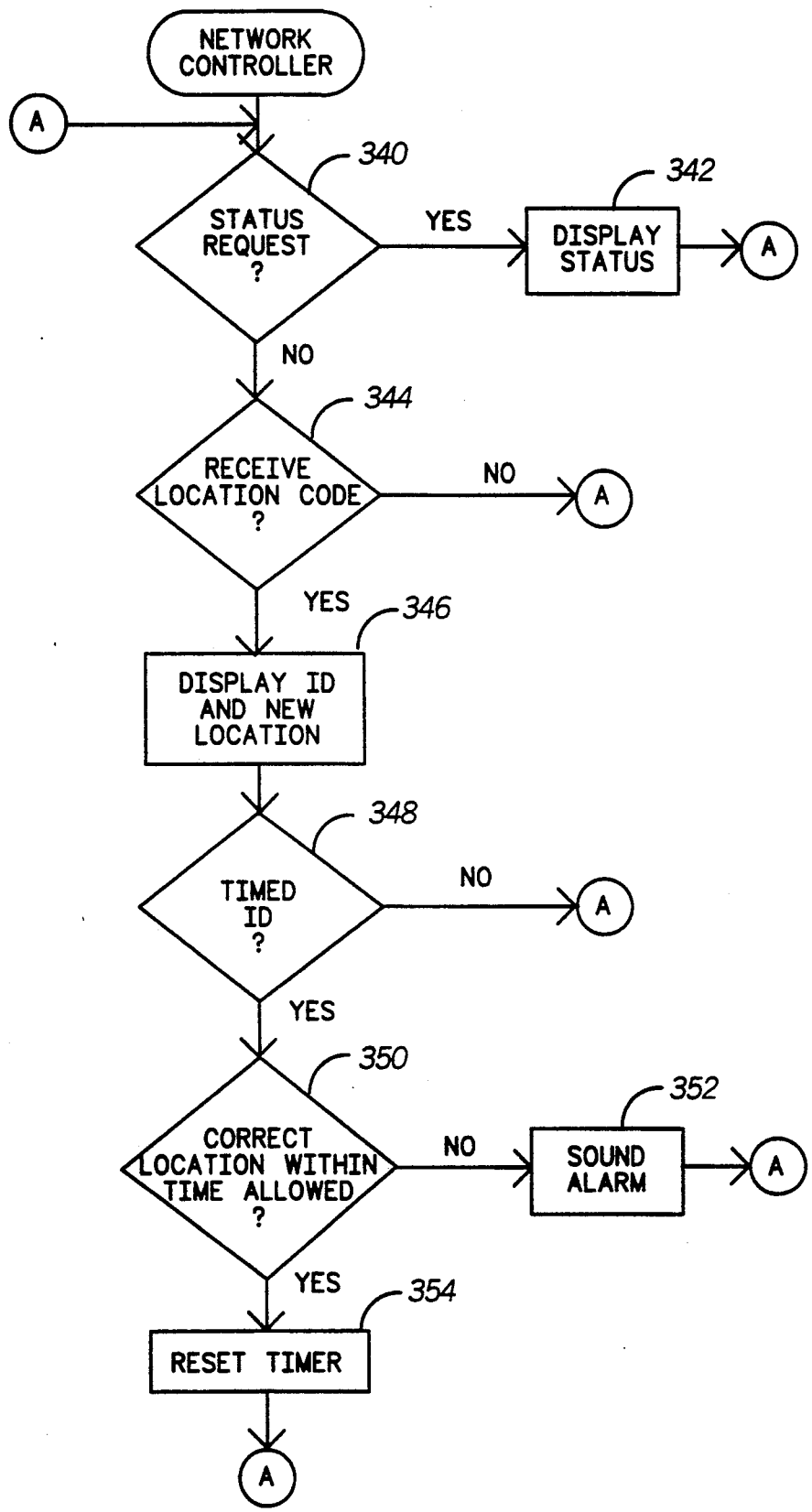
FIG. 5 is a flow diagram illustrating the steps executed by the network controller of FIG. 3.

Referring to FIG. 5, a flow diagram illustrating the steps executed by the network controller 18 in accordance with the present invention is shown. The routine begins with decision 340, which determines whether a status request has been received from the network supervisor. If so, the requested status is displayed (via display 84) in step 342 for the network supervisor. If, however, decision 340 determines that a status request was not received, the routine proceeds to decision 344, determines whether a transceiver has transmitted its ID and a new location code. An affirmative determination by decision 344 causes the ID code and the location code to be displayed (on the display 84) in step 346. Following this, decision 348 determines whether the received ID code corresponds to an individual that must follow a predetermined route while operating within the on-site system. A negative determination of decision 348 or decision 344 returns control via reference letter A. Assuming, however, that the individual associated with the received transceiver ID must follow a prearranged route, the routine proceeds to decision 350, which determines whether the individual properly progressed to the correct area within the allotted time. Failure to progress from area to area within the time allowed, or entering any area other than authorized results in a negative response from decision 350 and an alarm is activated in step 352. Conversely, if the individual has properly entered the correct area within the time allowed, a timer within the controller 78 is reset in step 354, which starts the timing interval for the individual to travel to the next area according to the prearranged route.

What is claimed is:

1. A communication system comprising:
   a first communication device comprising:
      first transceiver means for transmitting and receiving signals on a first communication medium selected from the group consisting of infrared waves, electromagnetic waves, ultrasonic waves, and radiation waves, when the first communication device is in an on-site area, the on-site area including a plurality of areas;
      second transceiver means for transmitting and receiving signals on a radio frequency communication medium, when the first communication device is in an off-site area; and
      determining means for determining when the first communication device is in the on-site area and when the first communication device is in the off-site area, the determining means being coupled to the first and second transceiver means; and
   network controller means comprising:
      means for determining if the first communication device is located in the on-site area; and
      alerting means responsive to the determining means of the network controller for providing an alert if the first communication device has not reached a select one of the plurality of areas in the on-site area.

2. A communication system as defined in claim 1, further comprising
   a second communication device comprising:
   a transceiver for transmitting and receiving signals on the radio frequency communication medium; and
   the network controller further comprising:
      a receiver means for determining if the second communication device is attempting to communicate with the first communication device; and
      a controller means responsive to the receiver means for informing the first communication device to switch the second transceiver means if the determining means of the network controller has determined that the first communication device is located in the on-site area.

3. A communication system as defined in claim 1, wherein the first communication device is a portable communication device.

4. A communication system as defined in claim 3, wherein the off-site area comprises a trunked radio frequency system.

5. A communication system as defined in claim 3, wherein the alerting means provides the alert only after the first communication has failed to reach the select one of the plurality of areas in the on-site area within a predetermined period of time.

* * * * *